(12) United States Patent
Madsen (10) Patent No.: US 11,469,461 B2
(45) Date of Patent: Oct. 11, 2022

(54) ENERGY STORAGE DEVICE

(71) Applicant: Dyson Technology Limited, Wiltshire (GB)

(72) Inventor: Alex Madsen, Swindon (GB)

(73) Assignee: Dyson Technology Limited, Malmesbury (GB)

( * ) Notice: Subject to any disclaimer, the term of this patent is extended or adjusted under 35 U.S.C. 154(b) by 174 days.

(21) Appl. No.: 16/494,866

(22) PCT Filed: Mar. 16, 2018

(86) PCT No.: PCT/GB2018/050694
§ 371 (c)(1),
(2) Date: Sep. 17, 2019

(87) PCT Pub. No.: WO2018/167514
PCT Pub. Date: Sep. 20, 2018

(65) Prior Publication Data
US 2020/0020894 A1 Jan. 16, 2020

(30) Foreign Application Priority Data
Mar. 17, 2017 (GB) ...................................... 1704292

(51) Int. Cl.
*H01M 50/10* (2021.01)
*H01M 50/107* (2021.01)
*H01M 10/04* (2006.01)

(52) U.S. Cl.
CPC ....... *H01M 50/10* (2021.01); *H01M 10/0422* (2013.01); *H01M 10/0431* (2013.01); *H01M 50/107* (2021.01)

(58) Field of Classification Search
CPC ....... H01M 50/10; H01M 10/04; H01M 10/06
See application file for complete search history.

(56) References Cited

U.S. PATENT DOCUMENTS 3,373,060 A * 3/1968 Gray ...................... C08K 5/523
429/94
3,395,043 A * 7/1968 Shoeld ................ H01M 10/125
429/94

(Continued)

FOREIGN PATENT DOCUMENTS

CN 1588688 A 3/2005
CN 103443988 A 12/2013

(Continued)

OTHER PUBLICATIONS

Notification of Reason for Refusal dated Jan. 6, 2021, directed to KR Application No. 10-2019-7028481; 12 pages.

(Continued)

*Primary Examiner* — Kenneth J Douyette
(74) *Attorney, Agent, or Firm* — Faegre Drinker Biddle & Reath LLP (57) ABSTRACT

An energy storage device comprising: a container, a mandrel, at least one sheet of separator material, and two or more electrodes. The container comprises an internal space bounded by an internal wall. The mandrel is positioned in the internal space and forms a cavity between a mandrel surface and the internal wall of the container. The sheet of separator material is arranged within the cavity about the mandrel to provide a plurality of discrete separator layers. An electrode is provided between each of the discrete separator layers, the mandrel is compressible, and the shape of the mandrel surface is concentric with the internal wall of the container.

8 Claims, 4 Drawing Sheets

(56) References Cited

U.S. PATENT DOCUMENTS

| | | | |
|---|---|---|---|
| 3,897,266 A | 7/1975 | Devitt et al. | |
| 4,158,300 A | 6/1979 | Hug et al. | |
| 4,212,179 A | 7/1980 | Juergens | |
| 5,323,527 A | 6/1994 | Ribordy et al. | |
| 5,521,021 A * | 5/1996 | Alexandres | H01M 10/0431 429/54 |
| 6,287,719 B1 | 9/2001 | Bailey | |
| 6,485,859 B1 * | 11/2002 | Szyszkowski | H01M 4/78 429/66 |
| 7,811,697 B2 | 10/2010 | Hyung et al. | |
| 8,129,048 B2 | 3/2012 | Hirakawa et al. | |
| 9,136,557 B2 | 9/2015 | Bouvier | |
| 9,742,045 B2 | 8/2017 | Chami et al. | |
| 2001/0036571 A1 | 11/2001 | Oogami et al. | |
| 2002/0160257 A1 | 10/2002 | Lee et al. | |
| 2003/0077506 A1 | 4/2003 | Michel et al. | |
| 2003/0091893 A1 | 5/2003 | Kishiyama et al. | |
| 2003/0162086 A1 | 8/2003 | Longhi, Jr. et al. | |
| 2006/0121339 A1 | 6/2006 | Woo et al. | |
| 2006/0222943 A1 | 10/2006 | Fujikawa et al. | |
| 2009/0061304 A1 | 3/2009 | Muraoka et al. | |
| 2009/0077794 A1 | 3/2009 | Hirakawa et al. | |
| 2009/0123833 A1 | 5/2009 | Mao et al. | |
| 2011/0104572 A1 | 5/2011 | Ahn et al. | |
| 2011/0217586 A1 | 9/2011 | Kim et al. | |
| 2011/0229747 A1 | 9/2011 | Mitani et al. | |
| 2012/0164494 A1 | 6/2012 | Schaefer et al. | |
| 2012/0328922 A1 | 12/2012 | Bonhomme et al. | |
| 2013/0004817 A1 * | 1/2013 | Lee | H01M 50/403 429/94 |
| 2013/0288115 A1 * | 10/2013 | Nidelkoff | H01M 10/0587 429/208 |
| 2013/0344363 A1 | 12/2013 | Upadhyaya | |
| 2014/0011076 A1 | 1/2014 | Kanemoto et al. | |
| 2014/0038027 A1 | 2/2014 | Kanemoto et al. | |
| 2014/0045052 A1 | 2/2014 | Kim | |
| 2014/0082930 A1 | 3/2014 | Bouvier | |
| 2014/0099525 A1 | 4/2014 | Kwon et al. | |
| 2014/0349158 A1 | 11/2014 | Kanemoto et al. | |
| 2020/0091545 A1 | 3/2020 | Madsen | |
| 2020/0091546 A1 | 3/2020 | Madsen | |
| 2020/0099086 A1 | 3/2020 | Madsen | |

FOREIGN PATENT DOCUMENTS

| | | |
|---|---|---|
| CN | 103733384 A | 4/2014 |
| CN | 103765665 A | 4/2014 |
| CN | 103782438 A | 5/2014 |
| CN | 104137318 A | 11/2014 |
| DE | 102012018040 A1 | 3/2014 |
| EP | 0797849 B1 | 11/2003 |
| EP | 1768202 A1 | 3/2007 |
| EP | 1348237 | 8/2011 |
| EP | 2693523 A2 | 2/2014 |
| EP | 2693553 A2 | 2/2014 |
| EP | 2696429 | 2/2014 |
| EP | 2757624 A1 | 7/2014 |
| JP | 08-083595 A | 3/1996 |
| JP | 11-086877 A | 3/1999 |
| JP | H11-73941 A | 3/1999 |
| JP | H11-204130 A | 7/1999 |
| JP | 2000-156241 | 6/2000 |
| JP | 2002-246278 A | 8/2002 |
| JP | 2003-529944 A | 10/2003 |
| JP | 2006-4792 A | 1/2006 |
| JP | 2006-313737 A | 11/2006 |
| JP | 2009-533833 A | 9/2009 |
| JP | 2011-198562 A | 10/2011 |
| JP | 2014-002836 A | 1/2014 |
| JP | 2014-036020 A | 2/2014 |
| JP | 2014-519166 A | 8/2014 |
| JP | 2015-2086 A | 1/2015 |
| JP | 2015-008092 A | 1/2015 |
| JP | 2015-141789 A | 8/2015 |
| JP | 2016-042433 A | 3/2016 |
| JP | 2016-519401 A | 6/2016 |
| KR | 10-0250163 B1 | 3/2000 |
| KR | 10-2006-0103028 | 9/2006 |
| KR | 10-2007-0065301 A | 6/2007 |
| KR | 10-2008-0036250 A | 4/2008 |
| KR | 10-2009-0110469 A | 10/2009 |
| KR | 10-2010-0137290 A | 12/2010 |
| WO | 02/45190 A1 | 6/2002 |
| WO | 2007/097172 A1 | 8/2007 |
| WO | 2012/133233 A1 | 10/2012 |
| WO | 2013/038946 A1 | 3/2013 |
| WO | 2016/050329 A1 | 4/2016 |

OTHER PUBLICATIONS

Notice of Reasons for Rejection dated Sep. 7, 2020, directed to JP Application No. 2019-550842; 8 pages.

International Search Report and Written Opinion dated May 30, 2018, directed to International Application No. PCT/GB2018/050694; 12 pages.

Search Report dated Sep. 21, 2017, directed to GB Application No. 1704292.0; 1 page.

Office Action received for Japanese Patent Application No. 2019-550842, dated Jun. 7, 2021, 6 pages (3 pages of English Translation and 3 pages of Original Document).

Office Action received for Korean Patent Application No. 10-2019-7028481, dated Jul. 8, 2021, 10 pages (5 pages of English Translation and 5 pages of Original Document).

International Search Report and Written Opinion received for PCT Patent Application No. PCT/GB2018/050691, dated Jun. 1, 2018, 11 pages.

International Search Report and Written Opinion received for PCT Patent Application No. PCT/GB2018/050692, dated May 29, 2018, 9 pages.

International Search Report and Written Opinion received for PCT Patent Application No. PCT/GB2018/050693, dated May 30, 2018, 10 pages.

Notice of Reasons for Rejection dated Jul. 27, 2020, directed to JP Application No. 2019-550576; 9 pages.

Notice of Reasons for Rejection dated Apr. 19, 2021, directed to JP Application No. 2019-550741; 9 pages.

Notice of Reasons for Rejection dated Aug. 17, 2020, directed to JP Application No. 2019-550854; 7 pages.

Notice of Reasons for Rejection dated Aug. 3, 2020, directed to JP Application No. 2019-550741; 13 pages.

Notification of Reason for Refusal dated Jan. 6, 2021, directed to KR Application No. 10-2019-7028478; 13 pages.

Notification of Reason for Refusal dated Jan. 6, 2021, directed to KR Application No. 10-2019-7028479; 10 pages.

Notification of Reason for Refusal dated Jan. 6, 2021, directed to KR Application No. 10-2019-7028480; 10 pages.

Office Action received for Korean Patent Application No. 10-2019-7028478, dated Jul. 8, 2021, 10 pages (5 pages of English Translation and 5 pages of Original Document).

Office Action received for Korean Patent Application No. 10-2019-7028479, dated Jul. 8, 2021, 9 pages (5 pages of English Translation and 4 pages of Original Document).

Office Action received for Korean Patent Application No. 10-2019-7028480, dated Jul. 8, 2021, 8 pages (4 pages of English Translation and 4 pages of Original Document).

Search Report dated Sep. 21, 2017, directed to GB Application No. 1704293.8; 1 page.

Search Report dated Sep. 21, 2017, directed to GB Application No. 1704294.6; 1 page.

Search Report dated Sep. 21, 2017, directed to GB Application No. 1704295.3; 1 page.

Office Action received for Chinese Patent Application No. 201880018914.7, dated Mar. 14, 2022, 22 pages (13 pages of English Translation and 9 pages of Original Document).

Office Action received for Chinese Patent Application No. 201880018955.6, dated Mar. 14, 2021, 23 pages (13 pages of English Translation and 10 pages of Original Document).

(56) References Cited

OTHER PUBLICATIONS

Office Action received for European Application No. 18714056.1, dated Feb. 5, 2021, 5 pages.
Office Action received for Chinese Patent Application No. 201880018923.6, dated Mar. 14, 2022, 26 pages (16 pages of English Translation and 10 pages of Original Document).
Office Action received for Chinese Patent Application No. 201880018923.6, dated Sep. 6, 2021, 15 pages (6 pages of English Translation and 9 pages of Original Document).
Office Action received for European Application No. 18714054.6, dated Feb. 5, 2021, 6 pages.
Office Action received for Chinese Patent Application No. 201880019128.9, dated Jun. 28, 2022, 17 pages (10 pages of English Translation and 7 pages of Original Document).

* cited by examiner

ENERGY STORAGE DEVICE

REFERENCE TO RELATED APPLICATIONS

This application is a national stage application under 35 USC 371 of International Application No. PCT/GB2018/050694, filed Mar. 16, 2018, which claims the priority of United Kingdom Application No. 1704292.0, filed Mar. 17, 2017, the entire contents of each of which are incorporated herein by reference.

FIELD OF THE INVENTION

This invention relates to a container for an energy storage device. More specifically, the present invention relates to a container for electrochemical cells.

BACKGROUND OF THE INVENTION

Electrochemical cells housed within energy storage devices comprise reactive and hazardous materials that require careful packing to ensure product safety. The packing should contain the hazardous material and also accommodate for changes in temperature and volume of the material as the cells charge and discharge. As well as having a desired robustness, the packaging is also required to have a low weight and volumetric efficiency, so as not to diminish the overall energy density of the energy storage device. The packing and design of the packaging should also avoid adding any unnecessary resistance gains to energy storage device.

Progress in energy storage technology has produced electrochemical cells with an increased energy density. This can lead to higher operating temperatures and large volume changes of active materials during a charge/discharge cycle compared to conventional electrochemical cells. Conventional packaging of energy storage may not be able to safely and efficiently accommodate cells with increased energy density.

Conventional prismatic or hard-case cell containers provide a more robust packaging for electrochemical cells. The electrodes and separator are wound under tension, providing pressure and good contact between the electrode layers and the separator. The rigid nature of the hard-case container does not allow for large volumetric expansion and contraction of electrodes during cycling.

Conventional soft-pack prismatic pouch packaging has been used to house a multi-electrode arrangement. In the soft-pack design, vacuum sealing ensures that the components of the cells are kept together by external pressure to provide the desired physical contact between the electrodes and the separator. In addition, the nature of the soft-pack material accommodates expansion of the electrodes during a charge/discharge cycle. However, the soft-design can be seen as being inherently unsafe as it can be easily damaged and rupture, and therefore unsuitable for high energy density cells.

SUMMARY OF THE INVENTION

In some embodiments, the present invention provides an energy storage device comprising: a container, a mandrel, at least one sheet of separator material, and two or more discrete electrodes; the container comprises an internal space bounded by an internal wall, the mandrel is positioned in the internal space and forms a cavity between a mandrel surface and the internal wall of the container, the sheet of separator material is arranged within the cavity about the mandrel to provide a plurality of discrete separator layers, and wherein an electrode is provided to occupy the space between each of the discrete separator layers, the mandrel is compressible, and the shape of the mandrel surface is concentric with the internal wall of the container.

Efficient and safe cell packing has been achieved by the energy storage device of the present invention. By having one or more cells within the container, the energy density of the device is dramatically increased. However, any volumetric changes caused by the expansion/contraction of the active material within each cell needs to be accommodated by the device. The compressible mandrel of embodiments of the present invention allows for a multiple stack of cells within a hard protective container. The compressible mandrel adapts to the volume of the electrodes within the stack to ensure that there is enough compression and a steady physical contact between the electrodes, whilst absorbing any expansion in the cells during a charge/discharge cycle. The use of a compressible mandrel may give rise to dead space within the energy storage device container and so can be seen to be less efficient than conventional vacuum sealing of soft-pack cell designs. However, the improved safety of a hard-case is important for high energy storage devices.

The combination of discrete electrode sheets and a compressible mandrel of embodiments of the present invention allows for a cell comprising a stack of efficiently connected high energy density electrodes stored within a resilient protective container, in contrast to typical wound cells that rely on a continuous sheet of anode/cathode electrode material wound within the separator material. As such the device may comprise two or more discrete positive electrodes and two or more discrete negative electrodes.

The plurality of the separator layers and the discrete electrodes which occupy the separator layers are aligned along a packing axis so that the cells expands and contracts in the same general direction as the packing axis. The compressible mandrel can be used as a winding aid, but more importantly adapts to the volume change of the electrodes within the separator layers to ensure that there is enough compression and a steady physical contact between the electrodes, whilst absorbing any expansion in the material during a charge/discharge cycle. In other words, embodiments of the present invention do not rely on a component of the electrochemical cell to be wound around the mandrel, the mandrel main function is to support the separator material against the inner surfaces of the container by contracting or expanding according to the electrode volume during a charge or discharge.

Having more than two discrete electrodes also has the advantage that a lower overall device resistance can be achieved by having connection tabs for each electrode in the stack. This is achieved by having shorter current path lengths between cells when compared to the path lengths in single continuous electrode cell designs found in conventional hard-case containers.

Embodiments of the present invention can allow for a device with multiple electrochemical cells that are stored robustly. In addition, a good level of contact is achieved from the biasing of the mandrel, which is compressible to absorb any expansion of the electrode material. The inner surface of the container which face the mandrel surfaces are concentric with the mandrel surfaces. By curving the inner surfaces, a more uniform pressure can be applied to the cells within the cavities against both the inner surface and the mandrel surface. This provides uniform pressure between the electrodes and the separator material and improves the efficiency of the cell. Preferably the mandrel is made of a single material to reduce the cost of manufacture and is shaped so as to be resiliently biased in the direction of the packing axis of the container. The curved face of the mandrel can provide a uniform stack pressure over the surface of the electrodes within the packaging if the inner surface is also curved. In addition, the mandrel surface can adapt its shape effectively to relieve any build-up of pressure during cell expansion.

The mandrel may have a single surface and be circular or arced in shape, or alternatively the mandrel may be shaped to have a second surface. For instance, the second surface of the mandrel may be curved such that the cross-sectional shape of the mandrel is elliptical. In some embodiments, the second mandrel surface may be flat and rest against another inner wall or surface of the container. In some embodiments, the second mandrel surface may contact the separator material to provide a compression force. The separator material contacting the second mandrel surface may be the same or different separator material that contacts the first mandrel surface. It is particularly advantageous when the arrangement of discrete electrodes along the packing axis align with the surface(s) of the mandrel. The surface of the mandrel can be greater or of the same length as the discrete electrode parts. This enables the compressive forces from expanding electrodes to be absorbed across the surface of the mandrel.

The inner surface of the container may be curved, such that the container is generally cylindrical in shape. The mandrel may be positioned such that its longitudinal axis aligns with the longitudinal axis of the container. In some embodiments, the cavity is generally pipe shaped, and the separator material sheet(s) are wound around the mandrel to fill the cavity. In some embodiments, devices of such configuration are relatively easy to construct. However, due to the spiral of the separator material sheet(s) and the difference in size of each separator layer, the size of the electrodes increases along the packing axis away from the mandrel.

In some embodiments, the container may be shaped such that is comprises a second inner surface opposite the inner surface. For example, the container might be cube or cuboid in shape with opposite faces being curved. In some embodiments, the packing axis may pass through the container from the inner surface to the second inner surface, and the mandrel may be positioned along the packing axis to provide a second cavity. At the least one sheet of separator material may be arranged in the second cavity to provide a second plurality of separator layers along the packing axis, and the one or more electrodes are provided between the second separator layers. Having a generally cube or cuboid shaped container allows for the electrodes to be of a similar size. Furthermore, the arrangement of the sheet(s) of separator material about the mandrel can take several forms. For example, a sheet of separator material can be wound about the mandrel, or a sheet of separator material could be folded in the cavity. When there is more than one cavity, at least one sheet of separator material may be provided in each cavity. Each cavity comprises at least one sheet of separator material. Furthermore, discrete rolls of separator material may be provided in each cavity. Having more than one sheet of separator material allows for different packing arrangements within the cavity/cavities and also means that damage of electrodes or separator material in one part of the device may be isolated.

The mandrel may be positioned centrally along the packing axis so that the separator layers and second separator layers are arranged symmetrically about the mandrel.

The container may have a packing axis that passes through the cavity, the mandrel surface, and the inner surface, and wherein the mandrel is compressible in the direction of the packing axis. Furthermore, the at least one sheet of separator material may be arranged in the cavity to provide a plurality of separator layers along the packing axis. The mandrel is compressible in the main direction of expansion that occurs in the cell, i.e. in the direction that the electrodes are expected to swell during a charge/discharge cycle.

BRIEF DESCRIPTION OF THE DRAWINGS

In order to better understand the present invention, and to show more clearly how embodiments of the invention may be put into effect, embodiments will now be described, by way of example, with reference to the following drawings.

DETAILED DESCRIPTION OF THE INVENTION

Figure 1:
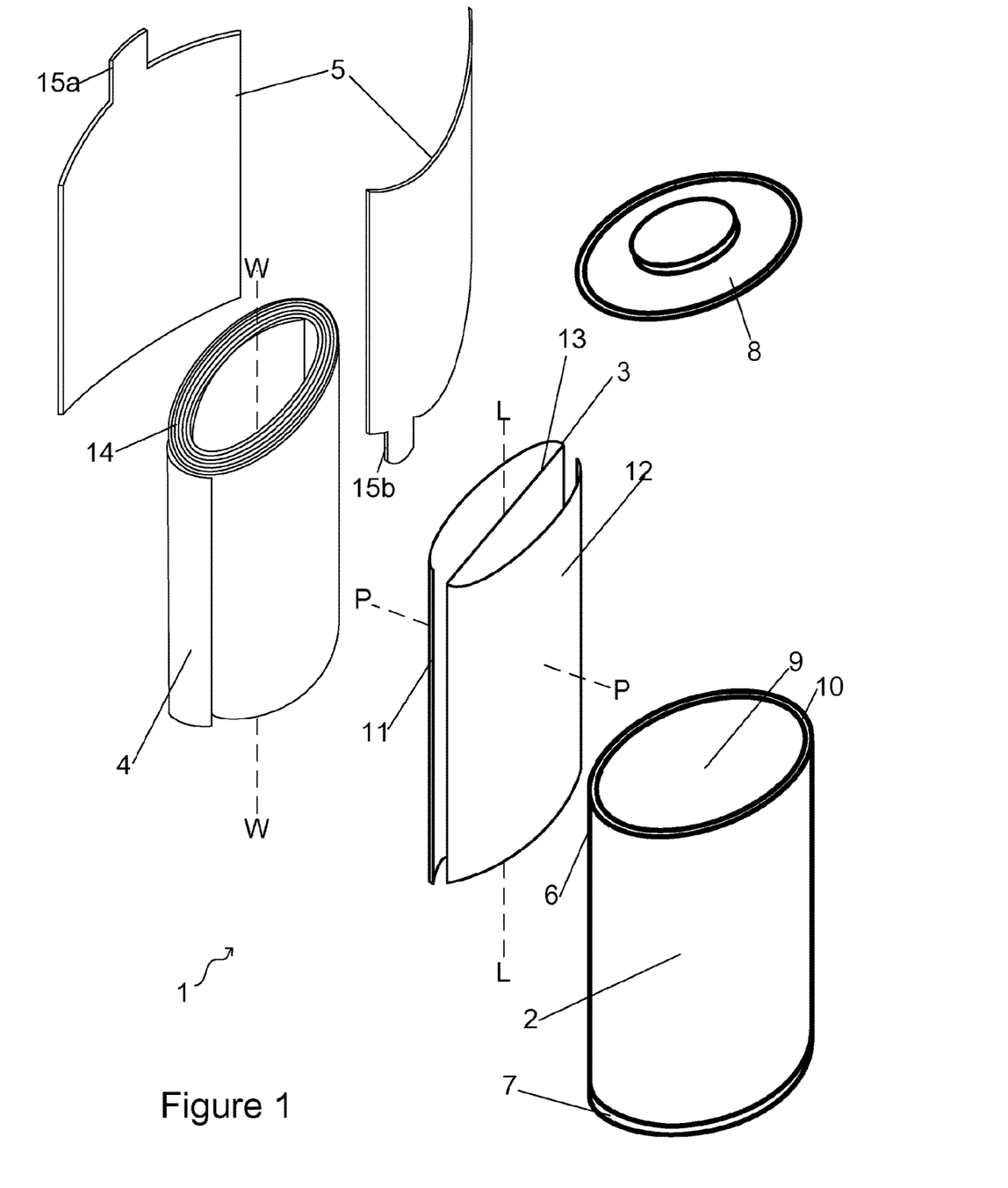
FIG. 1 is an exploded view of a schematic of an energy storage device of the present invention, according to some embodiments.

FIG. 1 shows an energy storage device 1 comprising a container 2, a compressible mandrel 3, separator material 4, and discrete electrodes 5. The container 2 has a casing 6, a base 7 and a cap 8 that together form the shell of the energy storage device 1. The casing 6 is formed of robust material to avoid external objects from piercing or rupturing the device 1. The casing 6 could be deep drawn/rolled/shaped and formed with the base 7 and cap 8 so as to form an internal space 9 for holding the electrochemical cell components, namely the compressible mandrel 3, separator material 4, and electrodes 5. The casing 6 has an inner surface 10 facing into the space 9. The base 7 and cap 8 are provided over the open ends of the casing 6 to enclose the electrochemical cell components 3, 4, 5 within the container 2. Although the base 7 and cap 8 are shown as separate parts from the casing 6, it is conceivable that the casing 6 may include, or be attached to, a preformed base 7 and cap 8.

The mandrel 3 has a first mandrel surface 11 and second mandrel surface 12 connected by an arm 13. The mandrel 3 is formed from a single piece of pliable material, such as a plastic or metal. The cross section of the mandrel 3 generally has the shape of an S and its outline is elliptical. The mandrel 3 has a longitudinal axis L which is normal to the S shape formed by the curved surfaces 11, 12 and the arm 13. The mandrel 3 extends along its longitudinal axis L such that it is similar in length to the container 2. The general cross-sectional shape of the mandrel 3 is the same along the entire length of its longitudinal axis L.

The mandrel 3 is formed so that it can be placed in the internal space 9 of the container 2. When the mandrel 3 is positioned within the internal space 9, a cavity 9a remains between the mandrel surfaces 11, 12 and the inner surface 10 of the container 2. Due to the shape of the mandrel 3, columns of hollow dead space exist between the mandrel surfaces 11, 12 and the arm 13 which extend along the longitudinal axis L. The hollow columns allow space for the mandrel 3 to collapses, as well as providing access for welding to at least part of the base 7 when the electrochemical cell components 3, 4, 5 are placed within the container 2.

The mandrel 3 is compressible in the direction of a packing axis P, which will be described in more detail in relation to the separator material 4. Generally speaking, the mandrel 3 can compress and/or deform such that the general elliptical shaped outline of its cross section decreases in size. The volume of the space 9 taken up by the mandrel 3 decreases as the mandrel 3 compresses. Furthermore, the mandrel surfaces 11, 12 can deform under extreme pressure such that the curvature or arc can change according to compression forces applied to the surface.

The separator material 4 as presented in FIG. 1 is a continuous sheet of electronically insulating porous material. The separator material 4 is rolled and positioned within the cavity 9a between the container 2 and the mandrel 3. The separator material 4 is wound around the mandrel 3 about a winding axis W which overlies the longitudinal axis L of the mandrel 3 when the electrochemical cell container 1 is in its complete form. As the sheet of separator material 4 is wound about winding axis W, layers of separator material are formed as the sheet rolls over itself. In the complete energy storage device 1, the separator material 4 is arranged in the container 2 to provide a plurality of separator layers placed along the packing axis P. This creates spaces 14 between layers of the separator material 4 which are occupied by the electrodes.

Electrodes 5 are positioned along the packing axis P within the spaces 14 of the wound separator material 4. For simplicity, only two electrodes 5 (one anode and one cathode along with the separator material 4 forming a cell) are shown in FIG. 1. However, an electrochemical cell container 1 may contain many electrodes 5, forming multiple electrochemical cells.

The electrodes 5 each comprise a tab 15a, 15b which can be secured to the internal surfaces of the base 7 and cap 8. By providing a tabs 15a, 15b on each electrode 5, the current path length for each electrode 5 is reduced and the internal resistance of the cell decreases.

As the cells charge/discharge, the electrodes 5 may expand and contract. As the electrodes 5 expand and occupy more volume within the internal space 9, the mandrel 3 compresses. Similarly, as the electrodes 5 contract, the mandrel 3 expands to re-occupy the volume whilst also providing a constant compressive force along the packing axis P between the separator material 4 and the electrodes 5. The curved mandrel surfaces 11, 12 ensure that a uniform pressure over the surface of the electrodes 5 is maintained.

Various electrochemical cell container 1 arrangements that are within the scope of the present invention are shown schematically in FIGS. 2a-2d. The electrochemical cell containers 1 are shown in cross section along the longitudinal axis L of the mandrel 3, and without electrodes 5 for simplicity. Each electrochemical cell container 1 is shown in an over simplified manner as a squared container 2. However, it is appreciated that the separator material 4 would curve to occupy the internal space 9 of the container 2.

Figures 2A, 2B:
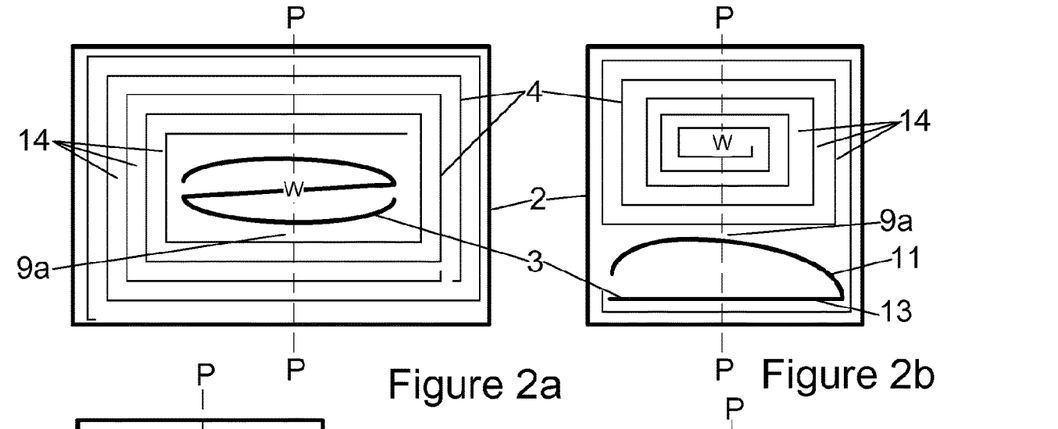
FIGS. 2a-2d are schematics of alternative layouts of separator material and mandrel within the energy storage device, according to some embodiments.

In FIG. 2a, two sheets of separator material 4 are wound about the mandrel 3. The mandrel 3 is positioned along the winding axis W of the separator materials 4. The sheets of the separator material 4 are concentric about the longitudinal axis L of the mandrel 3. A multitude of layers 14 is provided between the layers of the wound separator material 4 for housing electrodes 5. The electrodes 5 are arranged along the packing axis P.

In FIG. 2b, a mandrel 3 is provided with a single curved surface 11. The mandrel arm 13 rests against an internal surface 10 of the container 2. One sheet of separator material 4 is provided in the internal space 9 and is wound around a winding axis W. The winding axis W does not overlie the longitudinal axis L of the mandrel 3. Discrete layers 14 are provided in the roll of separator material 4 for housing electrodes. The electrodes 5 are arranged along the packing axis P.

Figure 2C:
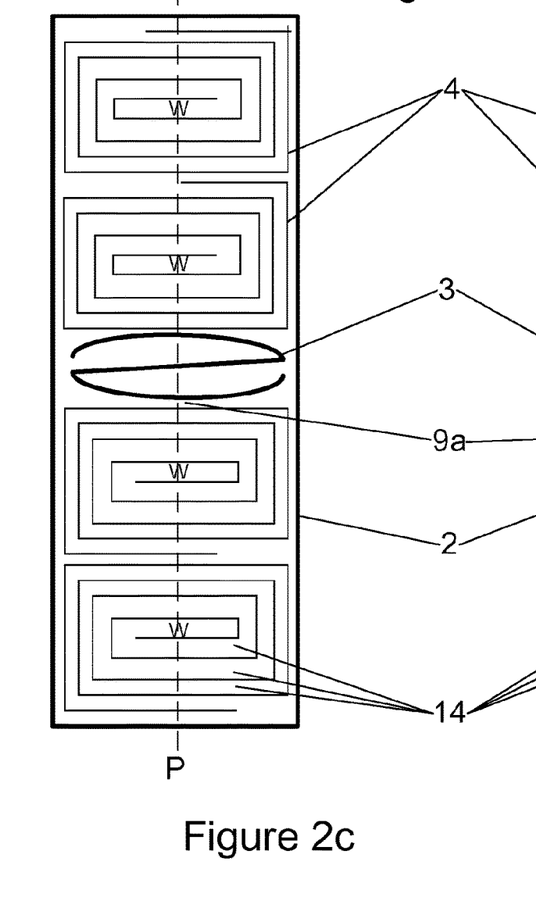
Figure 2D:
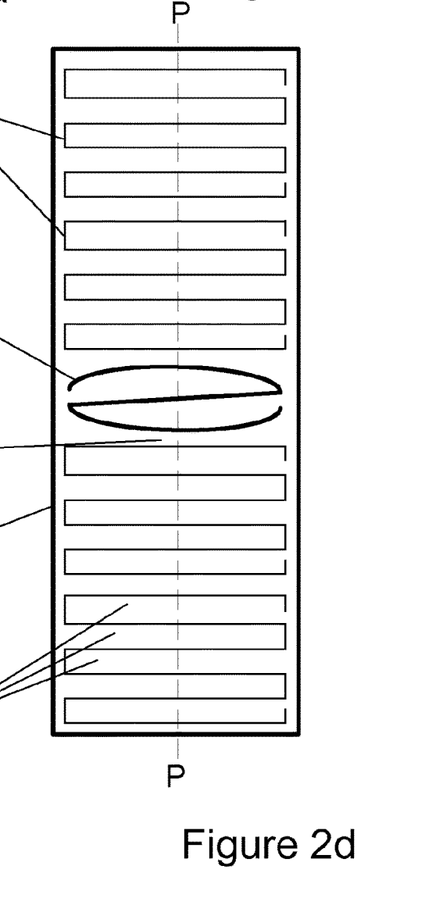

FIGS. 2c and 2d illustrate embodiments of the present invention, where rolls or folds of separator material sheets 4 are positioned in the cavities 9a about the mandrel 3, the separator 4 is not wound about the mandrel 3. The device in FIG. 2c comprises two rolled sheets of separator material 4 in each cavity 9a. In FIG. 2d, the sheets of separator material 4 are folded in the cavity 9a. Electrodes 5 would be placed within the spiral or folds of the separator material 4. In these cases, the mandrel 3 is merely functioning to absorb expansion of the electrode 5 within the device 1, and not providing a bobbin for material 4, 5 to be wound around.

Figure 3A:
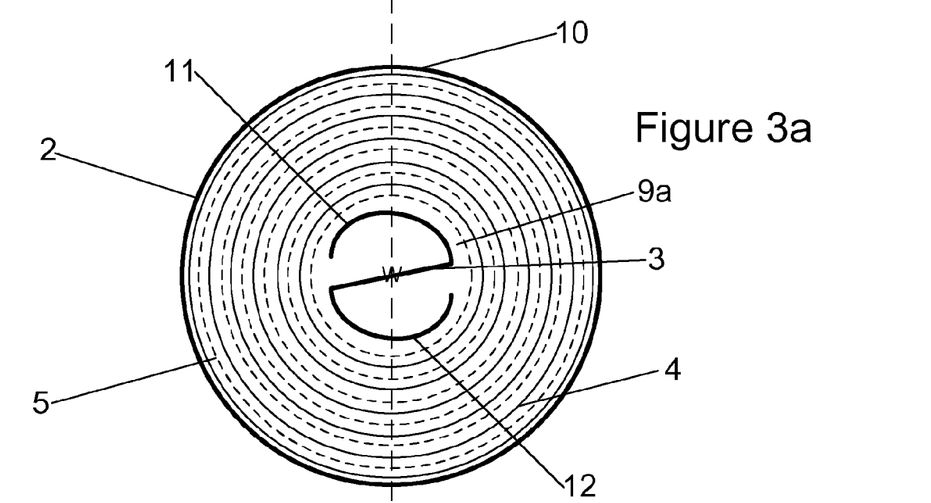
FIGS. 3a-3c are schematics of energy storage devices of the present invention, according to some embodiments.
Figure 3B:
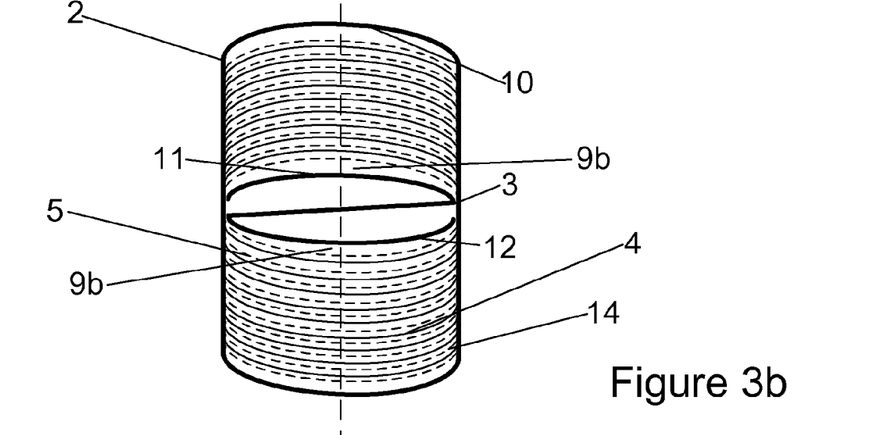
Figure 3C:
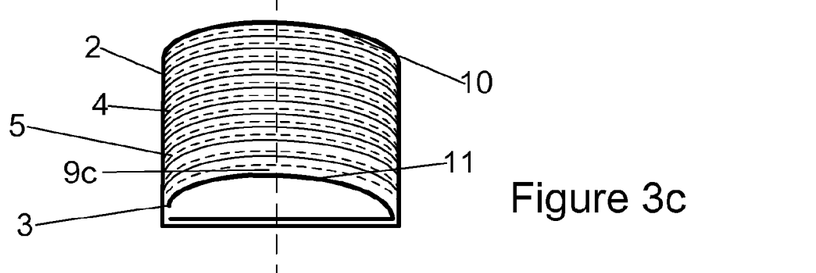

The container 2 in FIG. 1 is shown as cylindrical but could also form the shape of any prismatic cell. Cross-sectional schematics are shown in FIGS. 3a-3c of device 1. The layers of separator material 4 are shown as concentric rings instead of a continuous rolled sheet in the cavity 9a merely as a way of simplifying the drawing. Electrodes 5 are shown as broken lines and are positioned within the layers 14 between the rolled sheets of separator material 4. FIG. 3a shows a simplified cross sectional view of the complete device 1 of FIG. 1. The inner surface 10 is one continuous surface, and the mandrel surfaces 11, 12 face different regions of the same inner surface 10.

FIG. 3b illustrates a device 1 that has a generally cuboid shaped container 2, wherein the inner surfaces 10 facing the mandrel faces 11, 12 are concave. The separator material 4 is folded or wound so that fills the cavities 9b between the mandrel surfaces 11, 12 and the inner surface 10 of the container 2. The separator material 4 is arranged to provide layers 14 along the packing axis P, the layers being filled with electrodes 5. The curvature of the concave inner surface 10 similar to the curvature of the mandrel surfaces 11, 12 such that a uniform pressure is applied across the surface of the electrodes 5 within the layers 14 of separator material 4.

FIG. 3c illustrates a device 1 that has a generally cuboid shaped container 2, wherein the device 1 has only one cavity 9c which is filled with electrochemical cells. The inner surface 10 facing the mandrel face 11 is concave. The separator material 4 is folded or wound so that fills the cavity 9c between the mandrel surfaces 11, 12 and the inner surface 10 of the container 2. The separator material 4 is arranged to provide layers 14 along the packing axis P, the layers being filled with electrodes 5. The curvature of the concave inner surface 10 similar to the curvature of the mandrel surfaces 11, 12 such that a uniform pressure is applied across the surface of the electrodes 5 within the layers 14 of separator material 4.

In the examples shown in FIGS. 3a-3c, the curvature of the external casing matches the concave shape of the inner surfaces 10, the external casing may be flatted to provide an external cuboid shape. However, it may be beneficial to keep the curvature of the casing 6.

Figure 4A:
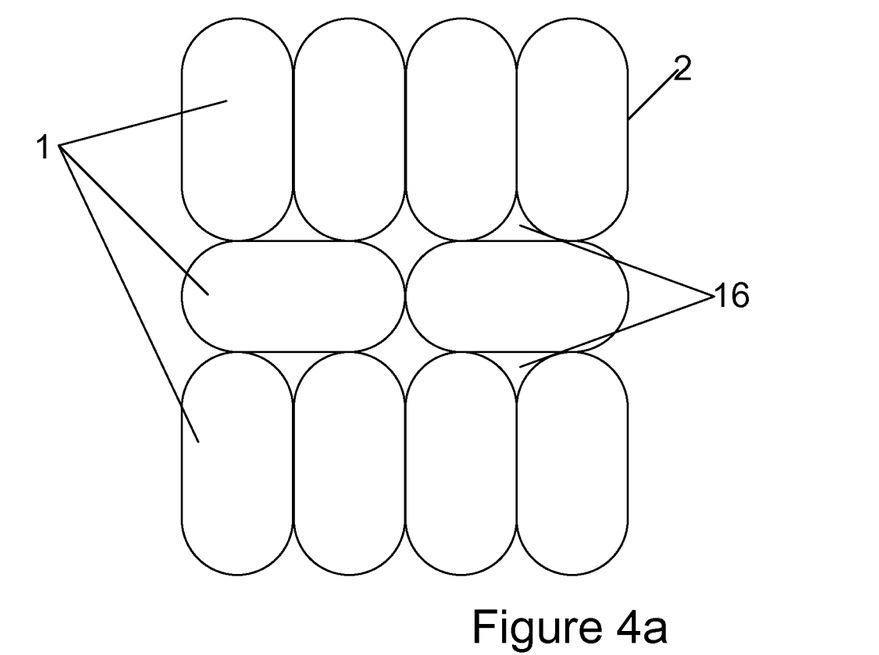
FIGS. 4a and 4b are schematics of arrays of alternative container shapes, according to some embodiments.
Figure 4B:
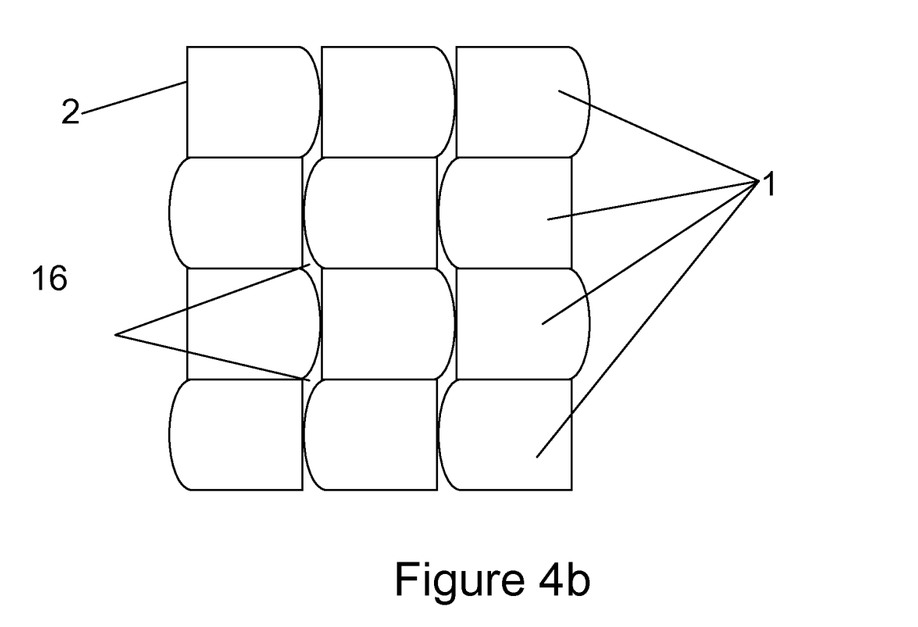

FIGS. 4a and 4b show an array of energy storage devices 1 according to FIGS. 3b and 3c respectively. The curvature of the casing 6 allows for gaps 16 between the containers 2 when arranged in an array. The curved casing 6 ensures that physical contact between adjacent containers 2 is reduced. A fluid such as air can be provided in the gaps 16 between the containers 2. The reduced contact between the containers 2 ensures that low heat transfer occurs between adjacent devices 1. In addition, fluid is free to flow over the array of containers and act as a coolant to remove any excess heat given off by the cells within the devices 1.

The invention claimed is:

1. An energy storage device comprising:
 a container comprising an internal space bounded by an internal wall;
 a mandrel positioned in the internal space and forming a cavity between a mandrel surface and the internal wall of the container;
 a first sheet of separator material arranged within the cavity about the mandrel to provide a first plurality of discrete separator layers; and
 a plurality of discrete electrodes comprising a plurality of discrete positive electrodes and a plurality of discrete negative electrodes,
 wherein the plurality of discrete electrodes occupies space at least between adjacent discrete separator layers of the first plurality of discrete separator layers,
 wherein the mandrel is compressible, and
 wherein the mandrel surface is concentric with the internal wall of the container such that the mandrel surface is spaced substantially equally apart from the internal wall along the mandrel surface.

2. The device of claim 1, wherein the mandrel surface comprises a first face, the first face being curved.

3. The device of claim 2, wherein the mandrel surface comprises a second face.

4. The device of claim 3, wherein the second face is curved such that a cross-section of the mandrel has an elliptical shape.

5. The device of claim 1, wherein the internal wall is concave and matches a curved profile of at least a portion of an external surface of a container wall.

6. The device of claim 1, wherein the container has a packing axis that passes through the cavity, the mandrel surface, and the internal wall, and wherein the mandrel is compressible in the direction of the packing axis.

7. The device of claim 6, wherein the first sheet of separator material is arranged in the cavity to provide the first plurality of discrete separator layers along the packing axis.

8. The device of claim 1, further comprising:
 a second sheet of separator material arranged within the cavity about the first plurality of discrete separator layers to provide a second plurality of discrete separator layers;
 wherein the plurality of discrete electrodes further occupies space between adjacent discrete separator layers of the second plurality of discrete separator layers.

* * * * *